US007119914B2

(12) United States Patent
Nakajima et al.

(10) Patent No.: US 7,119,914 B2
(45) Date of Patent: Oct. 10, 2006

(54) PRINTER COMPRISING DETECTION DEVICE TO DETECT WHETHER A DISCHARGED-RECORDING-MEDIUM TRAY OR A COVER MEMBER IS AT A POSITION TO OBSTRUCT CONVEYANCE OF A RECORDING MEDIUM

(75) Inventors: Yoshinori Nakajima, Kanagawa (JP); Seiji Takahashi, Kanagawa (JP); Hiroyuki Hyotani, Kanagawa (JP); Fumihiro Gotoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 10/153,603

(22) Filed: May 24, 2002

(65) Prior Publication Data

US 2002/0186399 A1 Dec. 12, 2002

(30) Foreign Application Priority Data

Jun. 1, 2001 (JP) ............................ 2001-166502
Apr. 23, 2002 (JP) ............................ 2002-120753

(51) Int. Cl.
*G06K 15/16* (2006.01)

(52) U.S. Cl. .................................................... 358/1.14

(58) Field of Classification Search ................ 358/1.14
See application file for complete search history.

(56) References Cited

U.S. PATENT DOCUMENTS 6,139,011 A * 10/2000 Huang et al. ............... 271/274
6,325,479 B1 12/2001 Nakamura et al. ............ 347/19

OTHER PUBLICATIONS

Hewlett Packard LaserJet 5N Printer User's Manual. First Edition, Apr. 1996. pp. 1-8, 1-9, 1-10, 7-2, 7-22, and 7-23. (Selected pages provided in Office Action).*
Hewlett Packard LaserJet 4 and 4M Printers User's Manual. First Edition, Oct. 1992. p. 7-1. (Selected pages provided in Office Action).*

* cited by examiner

*Primary Examiner*—Mark Zimmerman
*Assistant Examiner*—Jacob P. Rohwer
(74) *Attorney, Agent, or Firm*—Fitzpatrick, Cella, Harper & Scinto

(57) ABSTRACT

It is an object of the present invention to detect whether or not a conveying path is in a state capable of discharging a recording medium, having a recorded image thereon, outside of the apparatus, so as to prevent generation of a jam in conveyance and discharge of the recording medium. A state of covering a discharge port by a cover member is detected, and image recording on a recording medium is executed only when the recording medium can be conveyed and discharged. Non-execution of recording is indicated to an operator, and execution of recording is resumed when the cover member is moved to a state not obstructing conveyance and discharge of the recording medium.

9 Claims, 5 Drawing Sheets

| SENSOR OUTPUT | STATE OF DISCHARGED SHEET TRAY |
|---|---|
| 0 (LOW) | CLOSE |
| 1 (HIGH) | OPEN |

FIG.5A
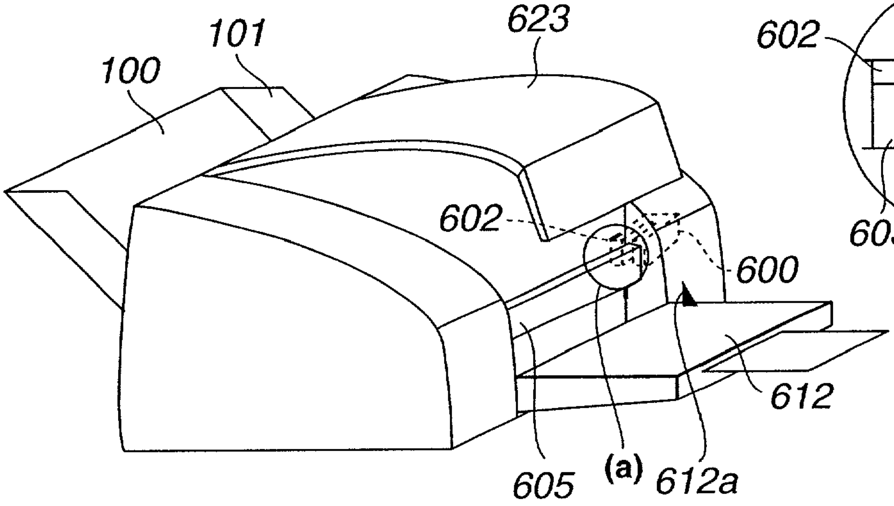
FIG.5B
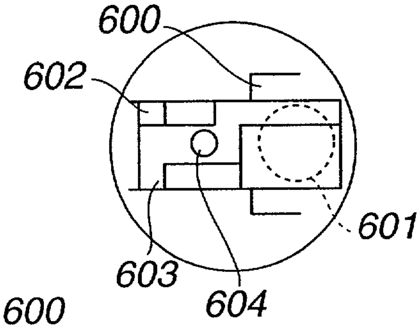
FIG.5C
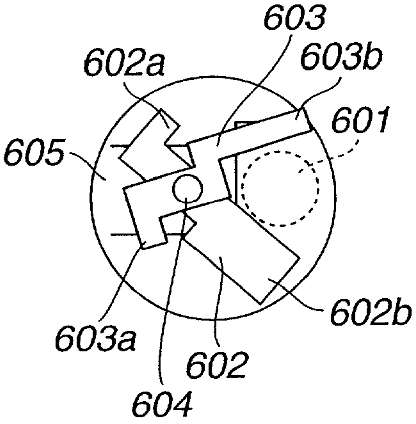
FIG.5D
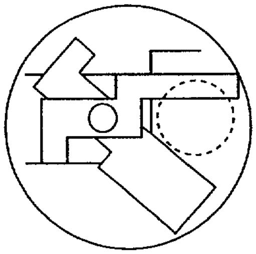
FIG.5E
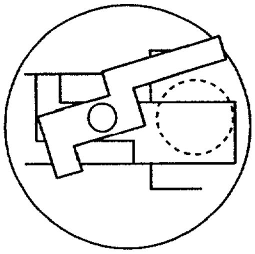
FIG.6
| SENSOR OUTPUT LEVEL | STATE OF DISCHARGED SHEET TRAY | STATE OF COVER |
|---|---|---|
| 0 (LOW) | CLOSE | CLOSE |
| 1 | OPEN | CLOSE |
| 2 | CLOSE | OPEN |
| 3 (HIGH) | OPEN | OPEN |

PRINTER COMPRISING DETECTION DEVICE TO DETECT WHETHER A DISCHARGED-RECORDING-MEDIUM TRAY OR A COVER MEMBER IS AT A POSITION TO OBSTRUCT CONVEYANCE OF A RECORDING MEDIUM

BACKGROUND OF THE INVENTION

1. Field of the Invention

The present invention relates to a printer executing recording on a recording medium, and more particularly, to a printer which can detect whether or not a conveying path of the recording medium is in a state capable of conveying and discharging the recording medium recorded on by a recording unit.

2. Description of the Related Art

Conventionally, a recording apparatus for performing recording on a recording medium such as paper, cloth, plastics, an OHP (overhead projector) sheet or the like (hereinafter simply termed "recording paper") is utilized as a printer. Such a printer may serve as an output apparatus of a facsimile apparatus, an electronic typewriter, a word processor, a work station or the like, or a handy or portable printer provided for a personal computer, a host computer, an optical-disk apparatus, a video apparatus or the like.

FIG. 8A is a diagram illustrating an external appearance of an ink-jet printer for forming an image by discharging ink droplets from an ink-jet recording head onto recording paper, as a commercially available example of such a printer.

In general, a printer mounts recording means, including, for example, an ink-jet recording head and an ink tank, on a carriage (not shown). The printer also typically includes recording-paper mounting means 100 for mounting recording paper, such as an automatic sheet feeder (ASF), and a discharge port 101 for discharging recording paper having a recorded image thereon at a front portion (facing an operator) of the printer. A discharged-sheet tray 102 for receiving discharged recording paper is provided at the discharge port 101.

A recording portion including a space necessary for executing recording on recording paper by the recording means is covered with a cover 103. The recording means mounted on the carriage can be exchanged by opening/closing the cover 103 (in a direction of arrow 107 shown in FIG. 8C). In some printers, a sensor for sensing the state of opening/closing of the cover 103 is provided. When the cover 103 is opened, a part of the recording portion covered with the cover 103 is externally exposed, so that the ink tank or the like can be exchanged by automatic movement of the carriage into the opened space.

As shown in FIG. 8A, the discharged-sheet tray 102 is at a position to cover the discharge port 101 during a non-recording state in order to prevent penetration of dust and the like into the recording portion. As shown in FIG. 8B, by drawing the discharged-sheet tray 102 in the direction of an arrow 106 after rotating it as indicated by an arrow 105, a substantially entire front surface of discharged recording paper having recorded image thereon can be received on the discharged-sheet tray 102. According to such a configuration, an area required to store such a printer in a non-recording state can be reduced.

In other printers, a discharge-port cover for openably/closably covering the discharge port 101, separate from the discharged-sheet tray 102, is provided, or only a discharge-port cover is provided without having the discharge-sheet tray 102.

In such printers, if recording is executed in a state in which the discharge-port cover or the discharge-sheet cover also operating as the discharged-sheet tray 102 covers the discharge port 101 (a non-recording state), discharged recording paper is obstructed by the discharge-port cover or the discharged-sheet tray 102, resulting in a jam of the recording paper. As a result, recorded matter cannot be used. Furthermore, if continuous recording is performed in this state, sheets of recording paper discharged at the discharge port 101 cannot be conveyed and are accumulated, thereby causing a jam and damage to the main body of the printer or the recording head.

In most of the recent printers, image formation on recording paper or the like is performed by receiving an image signal and a signal for controlling various functions, such as execution of recording, and the like, of a printer from the outside of the printer. For example, image formation is achieved by printing an image displayed on a display unit of a personal computer on recording paper. Accordingly, it frequently occurs that an operator operates commands for execution of recording from the personal computer without being aware of closure of a discharge-port cover or a discharged-sheet tray of the printer. This occurs particularly when the operator is present at a location remote from a location where the printer is installed.

Despite such a situation, confirmation whether or not the discharge-port cover or the discharged-sheet tray is in a state capable of performing recording is mainly left to the operator's attention.

SUMMARY OF THE INVENTION

It is an object of the present invention to provide a printer which can detect whether or not a conveying path is in a state capable of discharging a recording medium, having a recorded image thereon, outside of the apparatus.

It is another object of the present invention to provide a printer including an openable/closable cover member for covering a recording-medium discharge port in which, when executing recording, obstruction of discharge of a recording medium, having a recorded image thereon, due to closure of the cover member is prevented.

It is still another object of the present invention to provide a printer in which a state of covering a discharge port by a cover member is detected, and recording of an image on a recording medium is executed when the recording medium can be conveyed and discharged, and in which non-execution of recording is indicated to an operator, and execution of recording is resumed when the cover member is in a state of not obstructing conveyance and/or discharge of the recording medium.

According to one aspect, the present invention which achieves these objectives relates to a printer for executing image recording on a recording medium. The printer includes a housing having a space for executing image recording on the recording medium, a discharge port for discharging the recording medium from the housing, a cover member capable of being displaced between (i) a position obstructing the discharge port and (ii) a position where the recording medium can be discharged from the discharge port without being obstructed by the cover, and a detection device disposed at a position at which it can detect whether the cover member is at the position to obstruct conveyance of the recording medium.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 5A is a schematic diagram illustrating an external appearance of a printer according to a second embodiment of the present invention, and FIGS. 5B–5E are enlarged views of circle (a) in FIG. 5A;

FIG. 6 is a table illustrating sensor outputs in the printer shown in FIG. 5;

DETAILED DESCRIPTION OF THE PREFERRED EMBODIMENTS

The present invention can provide beneficial effects in a configuration in which (i) a member for covering or blocking a discharge port for discharging a recording medium from a printer is provided, (ii) the member can be displaced to a position capable of discharging the recording medium from the discharge port at least when executing recording, and (iii) conveyance of the recording medium for discharging it from the printer cannot be performed when the position of the member blocks conveyance, causing a jam. That is, the printer according to the present invention can detect whether or not a conveyance path is in a state capable of discharging a recording medium outside of the printer, and prevent generation of a jam in conveyance and discharge of the recording medium.

Preferred embodiments of the present invention will now be described in detail with reference to the drawings.

A description will now be provided of printers according to two of a plurality of embodiments of the present invention. More specifically, each of the printers includes a movable discharged-sheet tray as a member for blocking a discharge port, and detects whether or not the discharged-sheet tray is in a state adapted to recording (i.e., whether or not it blocks the discharge port). Recording is not executed or is interrupted in order to prevent damage to the main body of the printer or a recording head due to a sheet jam generated by an image forming material or an inadequate state of the discharged-sheet tray. The printer also notifies an operator of the above-described state, and resumes execution of image recording when it has been determined that the discharged-sheet tray is placed in an adequate state.

(First Embodiment)

Figure 1:
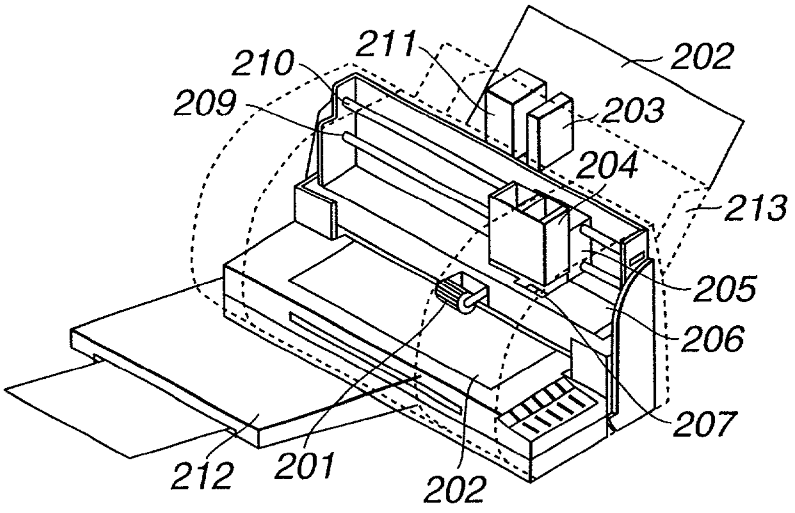
FIG. 1 is a schematic perspective view illustrating an external appearance of a printer according to a first embodiment of the present invention.

FIG. 1 is a schematic diagram illustrating an external appearance of an ink-jet printer, serving as a printer according to a first embodiment of the present invention.

In FIG. 1, a carriage 205 mounts an ink-jet head 207 and a cartridge holder 204, and is slidably supported on a guide shafts 209 and 210 so as to be able to perform scanning along the guide shafts 209 and 210.

After being fed from a sheet feeding tray 213, recording paper 202 is conveyed to a position facing ink discharge ports of the ink-jet head 207 by being grasped by a sheet feeding roller 201, a pinch roller (not shown) and a sheet pressing plate 206. At that position, a predetermined image is formed on a recording surface of the recording paper 202 by adherence of ink droplets discharged from the ink discharge ports, to execute recording. The recording paper 202 having the formed image thereon is discharged onto a discharged-sheet tray 212. "Execution of recording" indicates a series of operations including conveyance of the recording paper 202 to a recording portion, discharge of ink droplets onto the recording paper 202, and discharge of the recording paper from the recording portion to the outside of the printer via a discharge port.

Two types of ink cartridges are provided, i.e., a color-ink cartridge 211 accommodating ink liquids of three colors, i.e., yellow, magenta and cyan, and a black ink cartridge 203. These ink cartridges are separately inserted in a cartridge guide 204, and supply the ink-jet head 207 with ink liquids of respective colors.

A main-body cover 223 is a member for covering a recording portion including a space necessary for discharging ink droplets onto the recording paper 202 while the carriage 205 performs reciprocating movement, inclusive of a region corresponding to the width of the conveyed recording paper 202 and regions at both sides of the above-described region. The main-body cover 223 is a part of a main-body housing, and is openable/closable with respect to the main-body housing.

Figure 2A:
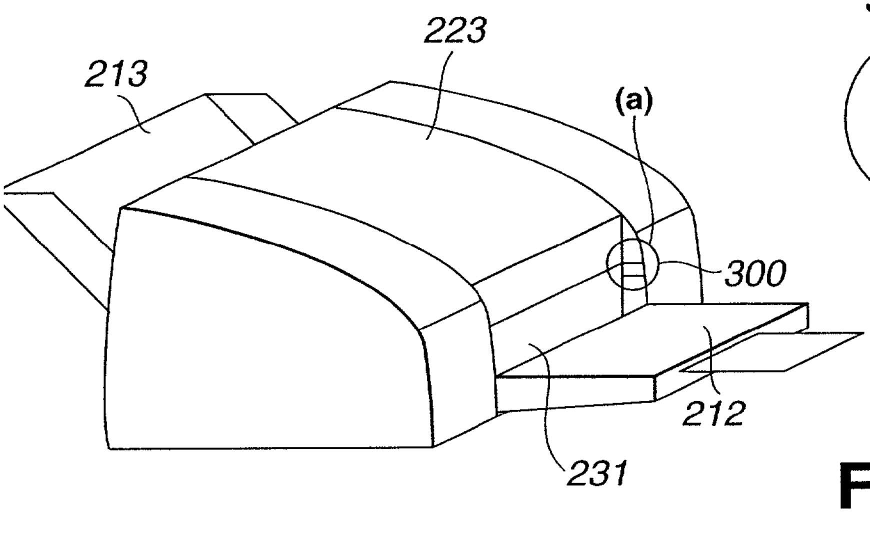
FIG. 2A is a schematic diagram illustrating an external appearance of a configuration in which opening/closing of a discharged-sheet cover of the printer shown in FIG. 1 is detected by a sensor.
Figure 2B:
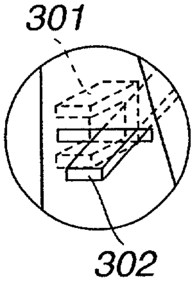
FIGS. 2B and 2C are enlarged views of circle (a) in FIG. 2A.
Figure 2C:
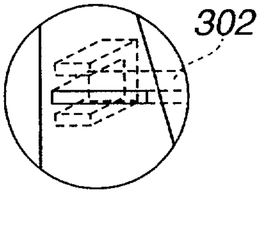

FIG. 2A illustrates a sensor 300 for detecting a state in which the discharged-sheet tray 212 covers a discharge port 231. FIGS. 2B and 2C are enlarged views of circle (a) in FIG. 2A, illustrating a portion of the printer where the sensor 300 is disposed. The sensor 300 includes an optical sensor 301 and a blocking plate 302. As shown in FIG. 2C, when the discharged-sheet tray 212 is closed so as to cover the discharge port 231, the blocking plate 302 rotates while contacting the discharged-sheet tray 212, to block the optical path of the optical sensor 301.

When providing the sensor 300 at a position of the main-body housing remote from the center of rotation of the discharged-sheet tray 212, the sensor 300 cannot detect the discharged-sheet tray 212 until the discharged-sheet tray 212 almost completely covers the discharge port 231. Accordingly, a placement of the sensor 300 is determined so that the blocking plate 302 contacts the discharged-sheet tray 212 when rotated to a position where the recording paper having the image formed thereon cannot be discharged outside of the printer, and is detected by the detector 300. According to this configuration, outputs as shown in FIG. 3 are obtained, and it is possible to detect whether or not the state of the discharged-sheet tray 212 does not obstruct conveyance and discharge of the recording paper 202 from the discharge port 231, i.e., whether the discharged-sheet tray 212 is in a state capable of executing recording (OPEN in FIG. 3) or in a state incapable of executing recording (CLOSE in FIG. 3), according to an output.

Figures 3, 4:
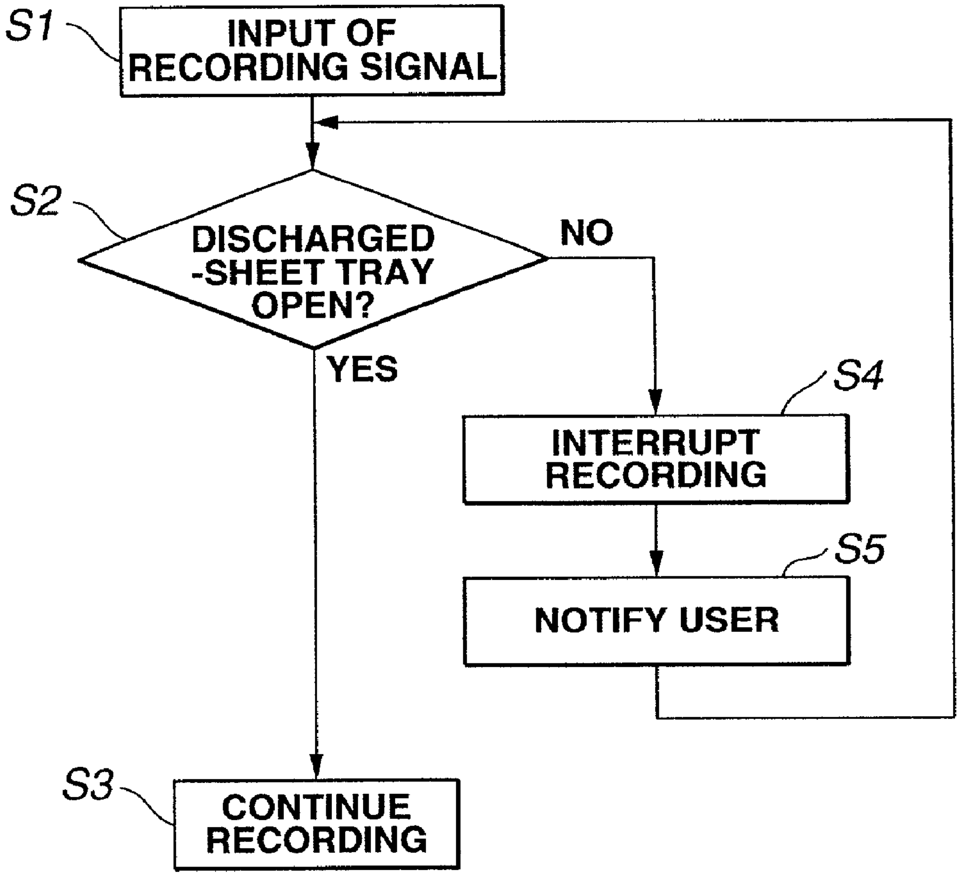
FIG. 3 is a table illustrating sensor outputs in the printer shown in FIG. 1.
FIG. 4 is a flowchart illustrating a recording operation of the printer shown in FIG. 1.

Next, a description will be provided of a recording operation when executing image recording on the recording paper 202 by the ink-jet printer shown in FIG. 2, with reference to FIG. 4.

Upon input of a command signal for executing recording from an electronic apparatus, serving as a host device, such as a personal computer or the like, to a control unit (not shown) provided within the housing of the printer (step S1), the control unit determines whether or not the discharged-sheet tray 212 is in the state capable of executing recording, based on information from the sensor 300 (step S2). If the result of the determination in step S2 is affirmative, the recording paper 202 is conveyed to the recording portion by the sheet feeding tray 213, and an image based on an image signal is formed on the recording paper 202 by ink droplets discharged from the ink-jet head 207 (step S3).

If the result of the determination in step S2 is negative, conveyance of the recording paper 202 from the sheet feeding tray 213 to the recording portion is not executed (step S4). In step S5, the fact that the discharged-sheet tray 212 is in a state inadequate for executing recording, i.e., that the discharged-sheet tray 212 is at a position to cover or obstruct the discharge port 231, is indicated to the operator by activating an LED (light-emitting diode) (not shown), or the like, provided at a position on the external cover of the printer, or is displayed on a display picture surface of a host device, such as a personal computer or the like. The notification to the operator may be also performed by a predetermined sound.

The process then returns to step S2, where it is again determined whether or not the operator has corrected the state of the discharged-sheet tray 212 to a state adapted to execution of recording. Thereafter, image recording on a recording medium may be resumed. The resumption of image recording may consist of resuming recording from a position where image recording has been interrupted.

A configuration in which recording can be executed in a state in which the main-body cover 223 is closed may be adopted, and recording may be executed only when both of the discharged-sheet tray 212 and the main-body cover 223 assume a state adapted to execution of recording. According to such a configuration, it is possible to prevent the generation of an accident, such as contact of a part of the operator's body with the carriage 205, which may be reciprocating at a high speed.

Although in the first embodiment, a rotated position of the discharged-sheet tray 212 is detected by the sensor 300, provided at the main-body housing, in order to detect contact with the discharged-sheet tray 212, the present invention is not limited to such detection. For example, the angle of rotation of a shaft for supporting rotational movement of the discharged-sheet tray 212 may be detected by electric means or magnetic means.

A position used to determine that the discharged-sheet tray 212, performing rotational displacement, is inadequate to execute recording depends on the size or the shape of the discharge port 231 of the printer, or the shape of the discharged-sheet tray 212. In any event, it is the position of the discharged-sheet tray 212 when recording paper discharged from the discharge port 231 is jammed at the discharge port 231 is of concern.

In addition, instead of the discharged-sheet tray 212, as in the first embodiment, a printer may also be used in which a discharge-port cover rotatably mounted at the position of the discharge port 231 blocks the discharge port 231.

(Second Embodiment)

Next, a second embodiment of the present invention will be described with reference to FIGS. 5–7. The second embodiment differs from the first embodiment in that a single sensor 600 can detect the state of opening/closing of a main-body cover (recording-portion cover) 623 and the state of opening/closing of a discharged-sheet tray 612. FIG. 5A illustrates a printer according to the second embodiment. Other configurations are the same as in the first embodiment, and a mode applicable to the first embodiment may also be applied to the second embodiment.

In FIG. 5A, reference numeral 600 represents an optical sensor, and reference numeral 601 represents a photosensing portion of the optical sensor 600. Two crank-shaped blocking plates 602 and 603, rotatable around the same center of rotation 604, are provided on a plate material 605, serving as a mechanical member of the main body of the printer. The blocking plate 602 has a portion 602*a* contacting a main-body cover 623 and a portion 602*b* for blocking about ⅔ of the photosensing portion 601. The blocking plate 603 has a portion 603*a* contacting a projection 612*a* of the discharged-sheet tray 612, and a portion 603*b* for blocking about ⅓ of the photosensing portion 601.

FIGS. 5B–5E are enlarged views of circle (a) in FIG. 5A. FIG. 5B illustrates the states of the blocking plates 602 and 603 when the main-body cover 623 and the discharged-sheet tray 612 are closed. The blocking portion 602*a* and the blocking portion 603*b* completely block the photosensing portion 601.

FIG. 5C illustrates the states of the blocking plates 602 and 603 when both of the main-body cover 623 and the discharged-sheet tray 612 are opened. In the blocking plate 602, the portion 602*b* is heavier than the portion 602*a* with respect to the center of rotation 604, and is situated below the photosensing portion 601. Similarly, in the blocking plate 603, the portion 603*a* is heavier than the portion 603*b* with respect to the center of rotation 604, and the portion 603*b* is situated above the photosensing portion 601.

FIG. 5D illustrates a state in which only the discharged-sheet tray 612 is closed, and the portion 603*a* of the blocking plate 603 contacts the projection 612*a* of the discharged-sheet tray 612. The projection 612*a* does not contact the blocking plate 602. The blocking plate 603 rotates in accordance with contact with the projection 612*a*, and the blocking portion 603*a* blocks about ⅓ of the photosensing portion 601.

FIG. 5E illustrates a state in which only the main-body cover 623 is closed, and the portion 602*a* of the blocking plate 602 contacts the main-body cover 623. The main-body cover 623 does not contact the blocking plate 603. The blocking plate 602 rotates in accordance with contact with the main-body cover 623, and the blocking portion 602*b* blocks about ⅔ of the photosensing portion 601.

FIG. 6 illustrates the relationship between outputs of the sensor 600 when the two blocking portions 602*b* and 603*b* block the photosensing portion 601, and the above-described FIGS. 5B–5E.

Figure 7:
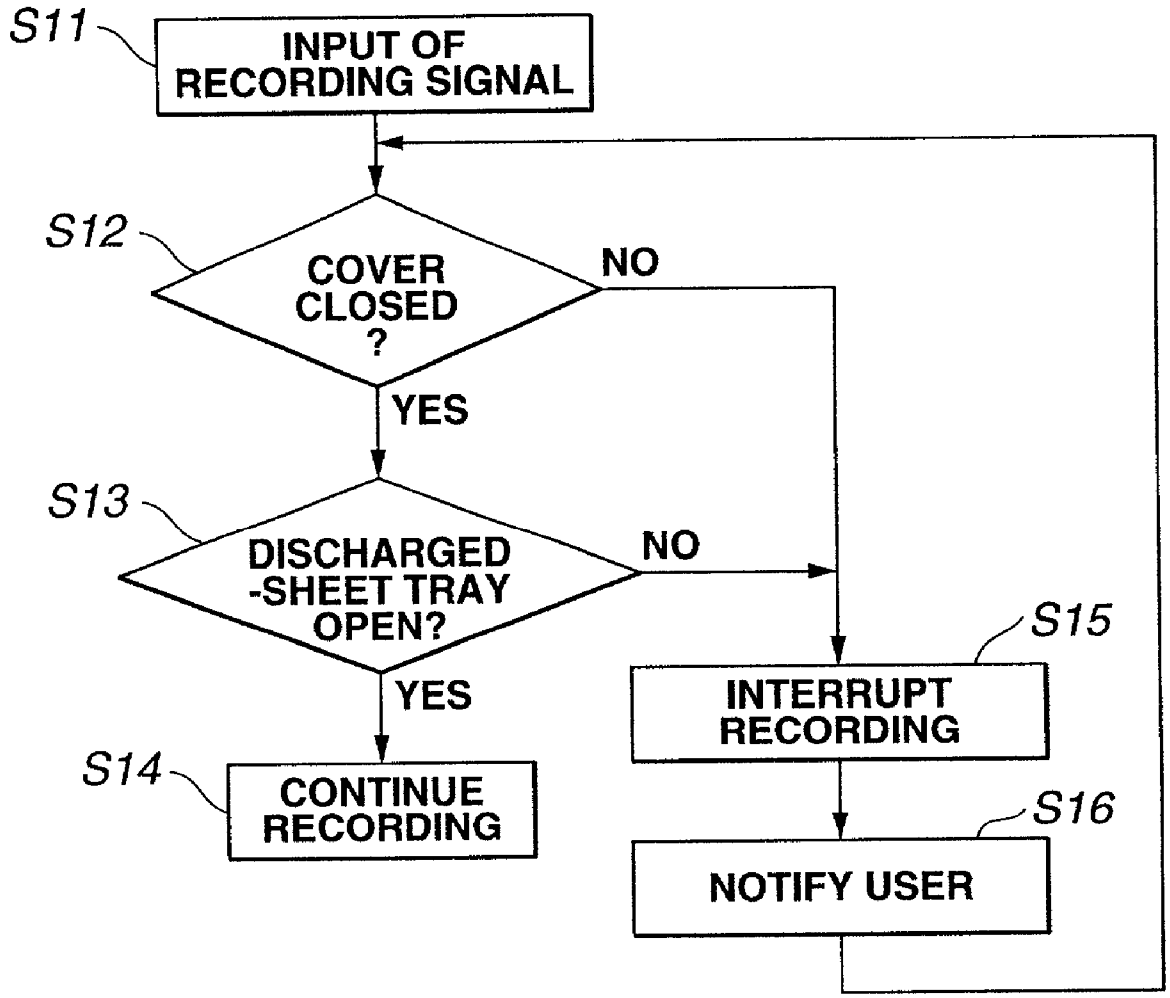
FIG. 7 is a flowchart illustrating a recording operation in the second embodiment.
Figure 8A:
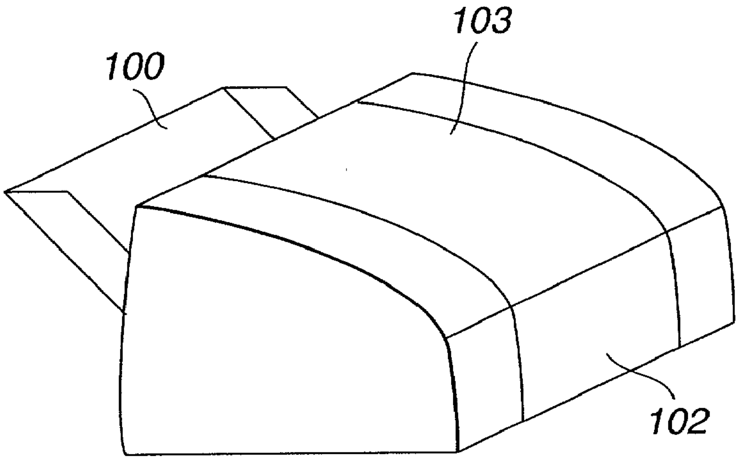
FIGS. 8A–8C are schematic diagrams, each illustrating an external appearance of movement of a cover and a discharged-sheet tray of a conventional printer.
Figure 8B:
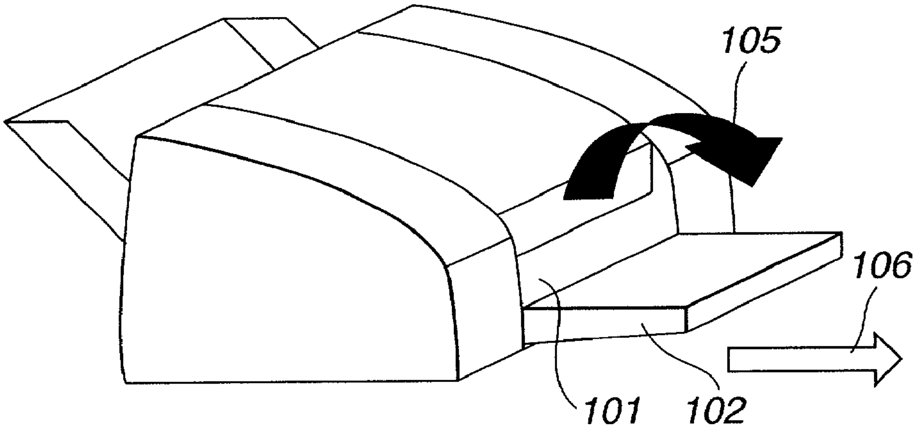
Figure 8C:
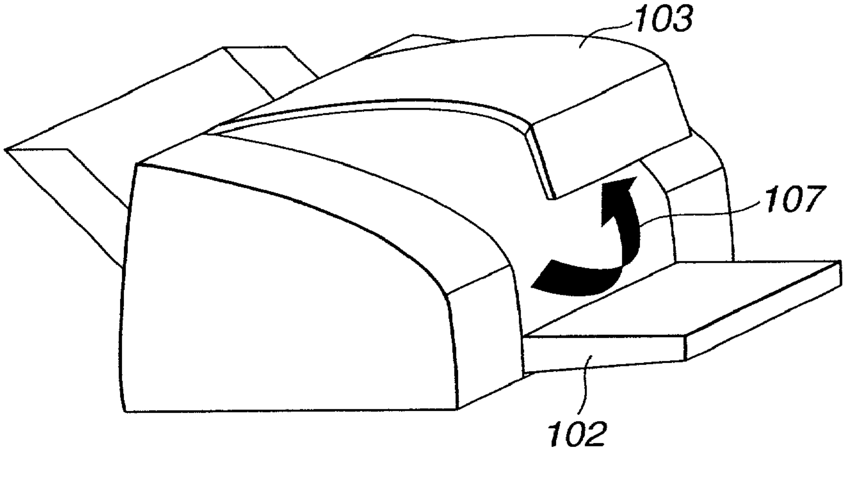

Next, a description will be provided of a recording operation when executing image recording on recording paper or the like using the printer shown in FIG. 5A, with reference to FIG. 7.

Upon input of an image recording signal from a host device, such as an external personal computer or the like, to the printer (step S11), a control unit (not shown) determines whether or not the main-body cover 623 is closed, based on information from the sensor 600 (step S12). If the result of the determination in step S12 is affirmative, then, in step S13, the control unit determines whether or not the discharged-sheet tray 612 is open based on information from the sensor 600. If the result of the determination in step S13 is affirmative, the process proceeds to step S14, where image recording on recording paper or the like is executed.

If the result of the determination in step S12 is negative, or the result of the determination in step S13 is negative, the process proceeds to step S15, where the recording operation is not performed or is interrupted. Then, in step S16, notification to the operator is performed according to a method similar to the above-described method in step S5. The process then returns to step S12, where it is determined whether or not the operator has closed the main-body cover 623. This determination is repeated until the main-body cover 623 is closed and the discharged-sheet tray 612 is opened. When resuming image recording on recording paper in step S14, recording may be resumed from a portion of interruption.

Although in the second embodiment, a recording operation is allowed only when the main-body cover 623 is closed and the discharged-sheet tray 612 is opened, a recording operation may also be allowed when the discharged-sheet tray 612 is open, irrespective of the state of opening/closing the main-body cover 623. However, when a recording operation is allowed in a state in which the main-body cover 623 is open, there is the possibility that the operator may be harmed by contacting the carriage 205, which typically reciprocates at a high speed, if the operator puts a hand into the printer. Accordingly, it is preferable to execute recording when the main-body cover 623 is closed, from the viewpoint of safety.

In a printer in which the ink tank and the recording head can be exchanged, if a configuration is adopted in which the carriage is moved to a position where the ink tank or the recording head can be exchanged, when the main-body cover 623 is opened, by detecting the state of opening/closing of the main-body cover 623, the operability of the printer is further improved.

As is apparent from the foregoing description, according to the second embodiment, since the cover member in a state of obstructing conveyance and discharge of recording paper from the printer can be detected, it is possible to execute a recording operation in a state of not obstructing discharge of recording paper from the printer. Furthermore, when a recording operation is executed in an inadequate state, the operator is notified of the inadequate state. As a result, it is possible to solve problems such as damage to a printed substance, the main body of the printer, or the recording head, due to a jam.

Furthermore, by also detecting a cover member near a discharge port by a conventional main-body-cover sensor, the cost can be reduced.

The individual components shown in outline in the drawings are all well known in the printer arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer for executing image recording on a recording medium, said printer comprising:

a housing having a space for executing image recording on the recording medium;

a discharge port configured and positioned to discharge the recording medium from said housing;

a cover member capable of being displaced between (i) a position obstructing said discharge port and conveyance of the recording medium and (ii) a position in which the recording medium can be discharged from said discharge port without being obstructed by said cover member;

a detection device disposed at a position at which said detection device can detect whether said cover member is at the position to obstruct conveyance of the recording medium, wherein said cover member comprises a discharge tray configured and positioned to receive the recording medium discharged from said discharge port;

a main-body cover member configured and positioned to openably/closably cover the space for executing image recording; and a main-body-cover detection device configured and positioned to detect a state of opening/closing of said main-body cover member;

wherein, when said cover member and said main-body cover member are detected to be at positions inadequate for execution of recording on the recording medium, execution by said printer of image recording on the recording medium is not performed, wherein a unit comprising said detection device and said main-body-cover detection device comprises:

an optical sensor having a photosensing portion, a first blocking plate configured and positioned to block a first prescribed area of said photosensing portion when said discharge tray is closed; and a second blocking plate configured and positioned to block a second prescribed area which is different from the first prescribed area of said photosensing portion when said main-body cover member is closed, and wherein execution by said printer of recording on the recording medium is not performed or is interrupted according to the output of said optical sensor when the photosensing portion is blocked by the first blocking plate.

2. A printer according to claim 1, wherein, when said detection device detects that said cover member is at the position to obstruct conveyance of the recording medium, execution by said printer of recording on the recording medium is not performed or is interrupted.

3. A printer according to claim 1, further comprising a device configured and positioned to notify an operator that said detection device has detected that said cover member is at the position to obstruct conveyance of the recording medium.

4. A printer according to claim 1, wherein, when said detection device does not detect that said cover member is at the position to obstruct conveyance of the recording medium, after said detection device has detected that said cover member is at the position to obstruct conveyance of the recording medium, execution of image recording on the recording medium is started.

5. A printer according to claim 1, wherein said printer comprises an ink-jet printer.

6. A printer according to claim 1, wherein, when said cover member and said main-body cover member are not detected to be at positions inadequate for execution of recording on the recording medium, after said cover member and said main-body cover member have been detected to be at positions inadequate for execution of recording on the recording medium, execution of image recording by said printer on the recording medium is started.

7. A printer according to claim 1, wherein execution by said printer of recording on the recording medium is started only when the first blocking plate is not blocking the photosensing portion and the second blocking plate is blocking the photosensing portion.

8. A printer according to claim 1, wherein the size of the first prescribed area and the size of the second prescribed area are different.

9. A printer according to claim 1, wherein the output of the optical sensor when the first blocking plate is blocking the photosensing portion and the output of the optical sensor when the second blocking plate is blocking the photo sensing portion are different.

* * * * *

UNITED STATES PATENT AND TRADEMARK OFFICE

CERTIFICATE OF CORRECTION

PATENT NO. : 7,119,914 B2
APPLICATION NO. : 10/153603
DATED : October 10, 2006
INVENTOR(S) : Yoshinori Nakajima et al.

It is certified that error appears in the above-identified patent and that said Letters Patent is hereby corrected as shown below:

<u>COLUMN 4</u>:
Line 2, "on a" should read --on--.

<u>COLUMN 5</u>:
Line 57, "is of" should read --that is of--.

Signed and Sealed this

Eighteenth Day of December, 2007

JON W. DUDAS
*Director of the United States Patent and Trademark Office*